United States Patent
Dharmadhikari et al.

(10) Patent No.: US 11,062,021 B2
(45) Date of Patent: Jul. 13, 2021

(54) SYSTEMS AND METHODS FOR PREVENTING MALICIOUS APPLICATIONS FROM EXPLOITING APPLICATION SERVICES

(71) Applicant: Symantec Corporation, Mountain View, CA (US)

(72) Inventors: Mayur Dharmadhikari, Pune (IN); Pankaj Meel, Pune (IN); Nikhil Joshi, Pune (IN)

(73) Assignee: NortonLifeLock Inc., Tempe, AZ (US)

( * ) Notice: Subject to any disclaimer, the term of this patent is extended or adjusted under 35 U.S.C. 154(b) by 87 days.

(21) Appl. No.: 15/688,911

(22) Filed: Aug. 29, 2017

(65) Prior Publication Data
US 2019/0065736 A1    Feb. 28, 2019

(51) Int. Cl.
*G06F 21/53*     (2013.01)
*H04L 29/06*     (2006.01)
(Continued)

(52) U.S. Cl.
CPC .......... *G06F 21/53* (2013.01); *G06F 9/45533* (2013.01); *G06F 9/45558* (2013.01);
(Continued)

(58) Field of Classification Search
CPC ... G06F 21/53; G06F 21/566; H04L 63/1433; H04L 63/1425; H04L 63/1441
See application file for complete search history.

(56) References Cited

U.S. PATENT DOCUMENTS

| | | | |
|---|---|---|---|
| 7,661,135 B2* | 2/2010 | Byrd | G06F 11/3476 726/11 |
| 8,266,698 B1* | 9/2012 | Seshardi | G06F 21/53 726/22 |

(Continued)

FOREIGN PATENT DOCUMENTS

| | | |
|---|---|---|
| CN | 111356985 A | 6/2020 |
| JP | 2008-500653 A | 1/2008 |

(Continued)

OTHER PUBLICATIONS

Akshita Sharma et at., "DDos Attacks Detection and Prevention with Cloud Trace Back," IJICSE, pp. 30-35, Jul.-Aug. 2015 (Year: 2015).*

(Continued)

*Primary Examiner* — Luu T Pham
*Assistant Examiner* — Canh Le
(74) *Attorney, Agent, or Firm* — FisherBroyles, LLP

(57) ABSTRACT

The disclosed computer-implemented method for preventing malicious applications from exploiting application services may include (i) identifying an attempt by an application, executing within a sandboxed environment that isolates the application's data and code execution from at least one other application executing within an operating system on the computing device, to launch at least one application service, (ii) determining that the application represents a potential security risk, (iii) prompting a user of the computing device to remediate the potential security risk posed by the application by performing a recommended security action, and (iv) while waiting for the user to perform the recommended security action, securing the computing device by blocking the attempt by the application to launch the application service. Various other methods, systems, and computer-readable media are also disclosed.

20 Claims, 7 Drawing Sheets

(51) Int. Cl.
*G06F 21/56* (2013.01)
*H04W 12/12* (2021.01)
*G06F 9/455* (2018.01)
*G06F 21/55* (2013.01)

(52) U.S. Cl.
CPC ............ *G06F 21/55* (2013.01); *G06F 21/566* (2013.01); *H04L 63/14* (2013.01); *H04L 63/1433* (2013.01); *H04W 12/12* (2013.01); *G06F 2009/4557* (2013.01); *G06F 2009/45587* (2013.01); *H04L 63/1425* (2013.01); *H04L 63/1441* (2013.01)

(56) References Cited

U.S. PATENT DOCUMENTS

| | | | | |
|---|---|---|---|---|
| 9,577,829 | B1* | 2/2017 | Roth | G06F 21/60 |
| 2006/0021029 | A1 | 1/2006 | Brickell et al. | |
| 2006/0288416 | A1* | 12/2006 | Costea | G06F 21/51 |
| | | | | 726/24 |
| 2008/0040800 | A1* | 2/2008 | Park | G06F 21/562 |
| | | | | 726/22 |
| 2008/0141232 | A1* | 6/2008 | Gandolph | G06F 9/445 |
| | | | | 717/154 |
| 2009/0282485 | A1* | 11/2009 | Bennett | H04L 63/145 |
| | | | | 726/24 |
| 2010/0122313 | A1* | 5/2010 | Ivgi | G06F 21/6218 |
| | | | | 726/1 |
| 2010/0169972 | A1* | 7/2010 | Kuo | G06F 21/564 |
| | | | | 726/23 |
| 2013/0145463 | A1 | 6/2013 | Ghosh et al. | |
| 2014/0032733 | A1 | 1/2014 | Barton et al. | |
| 2014/0101757 | A1* | 4/2014 | Gnesda | G06F 21/562 |
| | | | | 726/22 |
| 2014/0181973 | A1* | 6/2014 | Lee | G06F 21/562 |
| | | | | 726/23 |
| 2015/0332043 | A1* | 11/2015 | Russello | G06F 11/30 |
| | | | | 726/23 |
| 2016/0154686 | A1* | 6/2016 | Huang | G06F 3/0488 |
| | | | | 715/770 |
| 2019/0007436 | A1* | 1/2019 | Dods | H04L 63/1425 |

FOREIGN PATENT DOCUMENTS

| | | |
|---|---|---|
| JP | 2017-091541 A | 5/2017 |
| JP | 2020-531996 A | 11/2020 |
| WO | 2016/109283 A1 | 7/2016 |
| WO | 2016/182668 A | 11/2016 |
| WO | 2017/009415 A | 1/2017 |
| WO | 2019/046166 A1 | 3/2019 |

OTHER PUBLICATIONS

Nayden Markatchev et al. "A Cloud-based Interactive Application Service," IEEE, pp. 102-109, 2009 (Year: 2009).*

Zsombor Kovacs, Limitations of Android Antivirus Scanners, http://www.mrg-effitas.com/limitations-of-android-antivirus-scanners/; Jul. 20, 2017.

Rafael Fedler, Julian Schütte, Marcel Kulicke; On the Effectiveness of Malware Protection on Android: An evaluation of Android antivirus On the Effectiveness of Malware Protection on Android Apps; http://www.linkality.org/res/uploads/042013-Technical-Report-Android-Virus-Test.pdf; Apr. 1, 2013.

Chris Hoffman; Android Has a Big Security Problem, But Antivirus Apps Can't do Much to Help; https://www.howtogeek.com/232436/android-has-a-big-security-problem-but-antivirus-apps-cant-do-much/; Oct. 29, 2015.

International Search Report and Written Opinion received for PCT Application Serial No. PCT/US2018/048095 dated Oct. 16, 2018, 10 pages.

International Preliminary Report on Patentability received for PCT Application Serial No. PCT/US2018/048095 dated Mar. 12, 2020, 8 pages.

Notice of Reasons for Refusal received for Japanese Patent Application Serial No. 2020-510602 dated Mar. 30, 2021, 9 pages. (Including English Translation).

* cited by examiner

SYSTEMS AND METHODS FOR PREVENTING MALICIOUS APPLICATIONS FROM EXPLOITING APPLICATION SERVICES

BACKGROUND

Some modern-day operating systems (such as the ANDROID operating system) attempt to secure user and system data by installing and running applications within application "sandboxes." In a sandboxed computing environment, applications are typically prevented from accessing the data or code of other applications or system resources in an effort to prevent failures, vulnerabilities, or malicious code from spreading to other parts of the computing system.

Ironically, the same mechanisms that are designed to secure and protect sandboxed computing environments may also prevent security software installed within such an environment from performing a variety of common security actions (such as terminating, quarantining, and/or uninstalling applications). As such, malicious applications that are capable of circumventing the protections of a sandboxed computing environment may pose a particularly dangerous threat to the security of a user's device since security software installed within such an environment may have trouble effectively combating the same. The instant disclosure, therefore, identifies and addresses a need for improved systems and methods for protecting sandboxed computing environments from malicious applications.

SUMMARY

As will be described in greater detail below, the instant disclosure describes various systems and methods for protecting sandboxed computing environments from malicious applications. In one example, a method for performing such a task may include (i) identifying an attempt by an application, that is executing within a sandboxed environment that isolates the application's data and code execution from at least one other application executing within an operating system on the computing device, to launch at least one application service, (ii) determining that the application represents a potential security risk, (iii) prompting a user of the computing device to remediate the potential security risk posed by the application by performing a recommended security action, and (iv) while waiting for the user to perform the recommended security action, securing the computing device by blocking the attempt by the application to launch the application service.

In some embodiments, the operating system may be configured to sandbox all applications executing within the operating system by isolating each application's data and code execution from all other applications executing within the operating system. In one example, the sandboxed environment may prevent security software executing within the operating system from automatically quarantining and/or automatically uninstalling the application.

According to various embodiments, the attempt to launch the application service may include an attempt to capture sensitive information, transmit sensitive information, access a malicious resource, modify user data, generate a user prompt requesting elevated privileges, and/or generate an advertisement. In one example, the recommended security action may represent a computing operation that security software installed on the computing device is unable to perform by itself due to the sandboxed environment. In addition, prompting the user to remediate the potential security risk posed by the application may include prompting the user to terminate the application and/or uninstall the application. In some embodiments, blocking the attempt by the application to launch the application service may include preventing the application from launching the application service and/or automatically terminating the application service after the application has launched the application service. In these embodiments, the method may also include prompting, if the application service cannot be automatically terminated, the user to manually terminate the application that launched the application service. In one example, prompting the user to manually terminate the application that launched the application service may include periodically prompting the user to terminate the application until detecting that the user has successfully terminated the application.

A corresponding system for preventing malicious applications from exploiting application services may include several modules stored in memory, including (i) an identification module, stored in a memory device, that identifies an attempt by an application, executing within a sandboxed environment that isolates the application's data and code execution from at least one other application executing within an operating system on the system, to launch at least one application service, (ii) a determination module, stored in the memory device, that determines that the application represents a potential security risk, (iii) a notification module, stored in the memory device, that prompts a user of the system to remediate the potential security risk posed by the application by performing a recommended security action, (iv) a security module that, while waiting for the user to perform the recommended security action, secures the computing system by blocking the attempt by the application to launch the application service, and (v) at least one physical processor that executes identification module, the determination module, the notification module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify an attempt by an application, executing within a sandboxed environment that isolates the application's data and code execution from at least one other application executing within an operating system on the computing device, to launch at least one application service, (ii) determine that the application represents a potential security risk, (iii) prompt a user of the computing device to remediate the potential security risk posed by the application by performing a recommended security action, and (iv) while waiting for the user to perform the recommended security action, secure the computing device by blocking the attempt by the application to launch the application service.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

Figure 1:
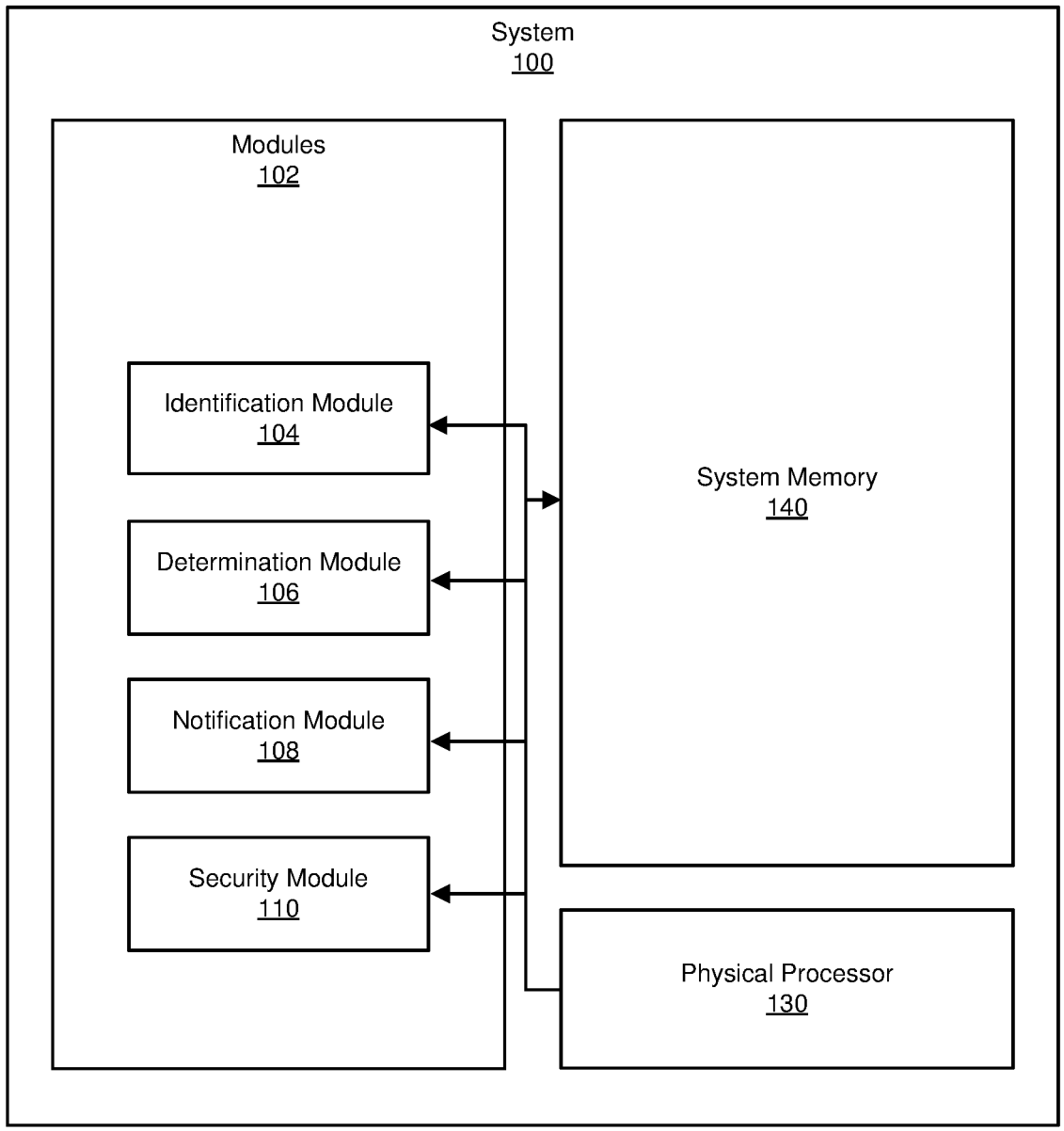
FIG. 1 is a block diagram of an example system for preventing malicious applications from exploiting application services.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for protecting sandboxed computing environments from malicious applications. As will be explained in greater detail below, sandboxed computing environments typically prevent security software from performing a variety of common security actions, such as terminating, quarantining, and/or uninstalling malicious applications. While security software installed within such an environment may inform a user of a computing device about vulnerabilities and provide instructions to remedy the same, the window of time between when the user is informed about a security risk and when the user successfully performs an action sufficient to remedy the same may be long enough for a malicious application to misappropriate, disrupt, and/or otherwise negatively impact the user's hardware, software, or information. By blocking attempts by malicious applications to launch application services until the user is able to successfully perform a more permanent security action, however, the systems disclosed herein may secure the user's computing device during this window of vulnerability, in turn minimizing and/or eliminating the negative effects of malware within sandboxed computing environments.

Figure 2:
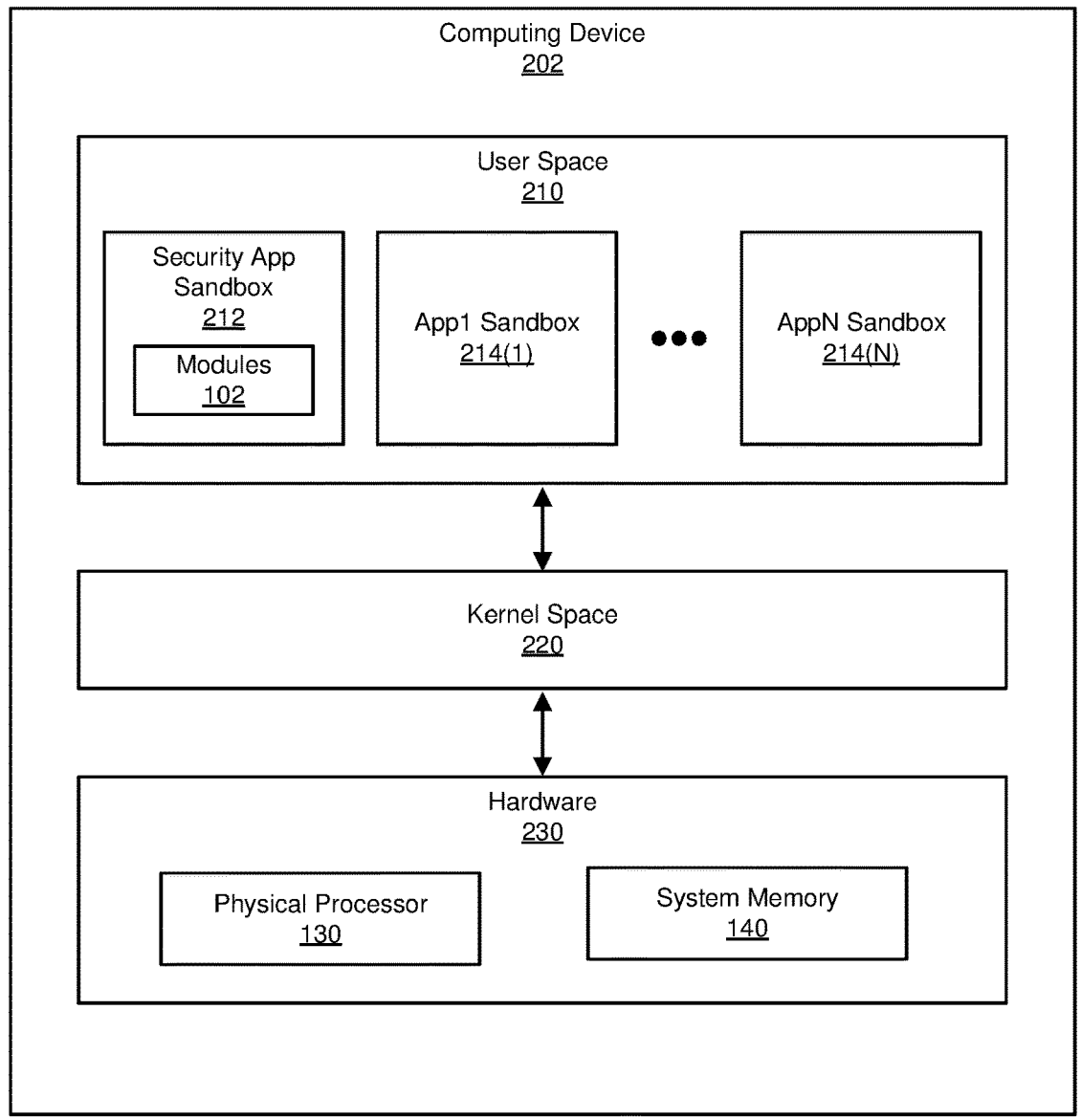
FIG. 2 is a block diagram of an additional example system for preventing malicious applications from exploiting application services.

The following will provide, with reference to FIGS. 1-2, detailed descriptions of example systems for preventing malicious applications from exploiting application services. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of an example system 100 for preventing malicious applications from exploiting application services. As illustrated in this figure, example system 100 may include one or more modules 102 for performing one or more tasks. For example, and as will be explained in greater detail below, modules 102 may include an identification module 104 programmed to identify an attempt by an application, that is executing within a sandboxed environment, to launch at least one application service. Modules 102 may also include a determination module 106 programed to determine that the application represents a potential security risk and a notification module 108 programmed to prompt a user of the computing device to remediate the potential security risk posed by the application. Finally, modules 102 may include a security module 110 that, while waiting for the user to perform the recommended security action, is programmed to secure the computing device by blocking the attempt by the application to launch the application service. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the device illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as system memory 140. System memory 140 generally represents any type or form of volatile or non-volatile storage device or medium capable of storing data and/or computer-readable instructions. In one example, system memory 140 may store, load, and/or maintain one or more of modules 102. Examples of system memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in system memory 140. Additionally or alternatively, physical processor 130 may execute one or more of modules 102. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of an example system 200 in FIG. 2. As shown in FIG. 2, system 200 may include a computing device 202 that includes a user space 210, a kernel space 220, and hardware 230. In one example, all or a portion of the functionality of modules 102 may be implemented by a security application executing within a security app sandbox 212.

Computing device 202 generally represents any type or form of computing device capable of reading computer-executable instructions. Examples of computing device 202 include, without limitation, laptops, tablets, desktops, servers, cellular phones or other mobile devices, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

In one example, an operating system (such as ANDROID) on computing device 202 may execute one or more user applications within a sandboxed environment. The terms "sandbox" or "sandboxed environment," as used herein, generally refers to a computing environment in which at least one aspect of an application (such as its data and/or code execution) is isolated from at least one other aspect of application and/or system software executing within the computing environment. In some examples, a sandbox may be accomplished by allocating a tightly controlled set of resources, such as scratch space on disk and memory, to each sandboxed application within a user space, such as user space 210.

In the example illustrated in FIG. 2, each application may be assigned its own sandbox within user space 210 such that each application is isolated from all other applications. For example, a security application may be isolated within security app sandbox 212, a first application ("app1") may be isolated within app1 sandbox 214(1), a second application ("appN") may be isolated within appN sandbox(N), and so on. In some examples, each application sandbox may be associated with its own, unique user ID ("UID"), such as a UID assigned by LINUX-based operating systems such as the ANDROID operating system.

In some embodiments, the sandboxed environment of computing device 202 may prevent security software (such as a security application executing within security app sandbox 212) from automatically terminating (e.g., force-killing), quarantining, and/or uninstalling other applications, such as the applications executing within sandboxes 214(1)-(N). For example, the sandboxed environment illustrated in FIG. 2 may be configured to prevent each user application (including security software) from accessing any other application's sandbox, including the data and/or code stored therein. As discussed below, this lack of file-level access to other applications may also limit the ability of a security application installed within such an environment to perform common security actions. For example, since the ANDROID operating system prevents any given application (including security software) from terminating (e.g., force-killing) and/or uninstalling any other application that has a differing UID and/or is signed with a different system key, security software within ANDROID may be unable to terminate, quarantine, and/or uninstall other applications, including malicious applications that the security software has identified as representing a security risk.

Figure 3:
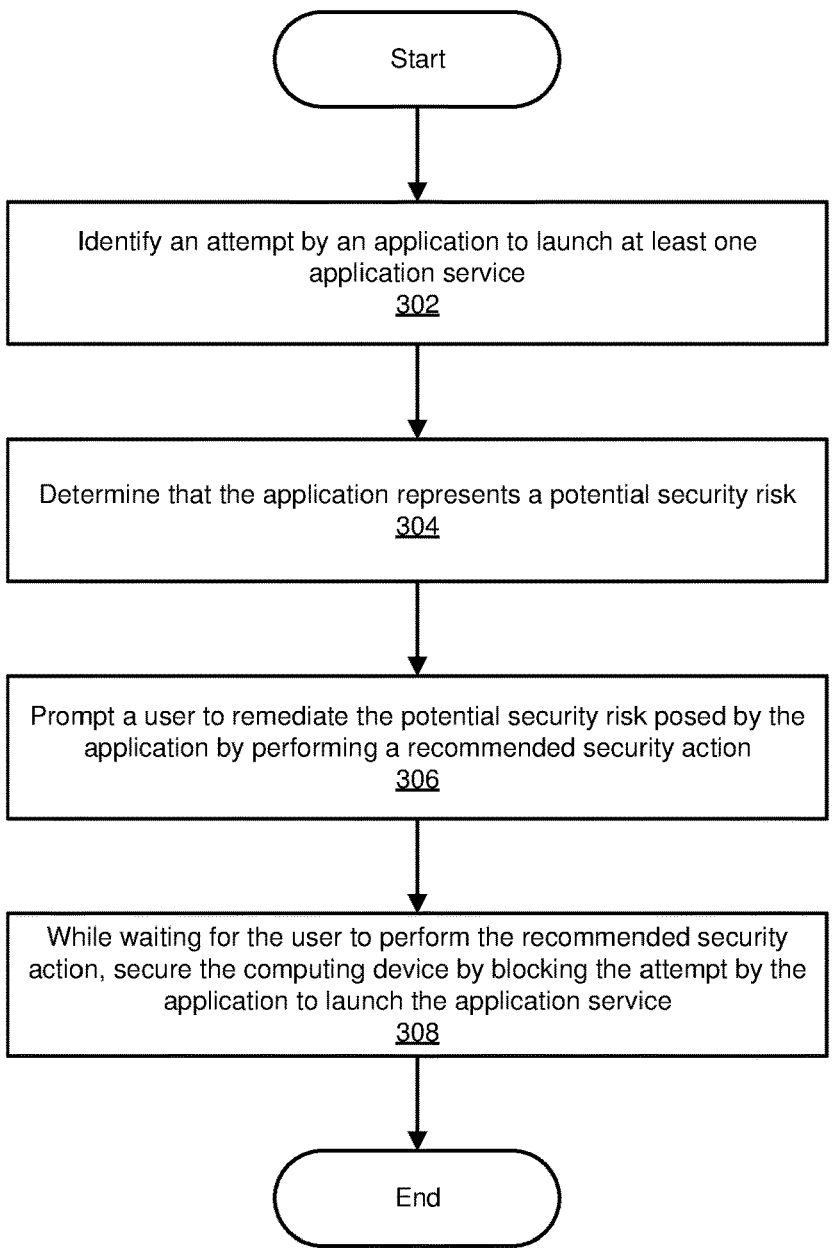
FIG. 3 is a flow diagram of an example method for preventing malicious applications from exploiting application services.

FIG. 3 is a flow diagram of an example computer-implemented method 300 for preventing malicious applications from exploiting application services. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify an attempt by an application, executing within a sandboxed environment that isolates the application's data and code execution from at least one other application executing within an operating system on a computing device, to launch at least one application service. For example, identification module 104 may, as part of a security application executing on computing device 202 in FIG. 2 (e.g., a security application executing within security app sandbox 212 in user space 210), identify an attempt by an application (e.g., an application executing within app1 sandbox 214(1) in user space 210) to launch an application service.

The term "application service," as used herein, generally refers to any type or form of application or system component capable of performing a computing task on behalf of an application. In some examples, an application service may refer to a computing task that is performed in the background (i.e., when a user of the computing device is not interacting with the application in the foreground or an active window). In addition to performing a host of legitimate tasks, application services may be used by malware developers to perform a variety of nefarious tasks, including, for example, capturing sensitive information (by, e.g., logging keystrokes, generating screen captures, sniffing passwords, etc.), transmitting sensitive information (to, e.g., unauthorized third parties), modifying user and/or system data (e.g., encrypting, deleting, and/or corrupting user and/or system data), generating user prompts requesting elevated privileges (e.g., prompts that request that a user grant the application permission to access sensitive data or resources, such as access to the user's contacts, the device's camera, etc.), accessing malicious resources (e.g., downloading malicious files), generating and/or serving advertisements, etc.

The systems described herein may perform step 302 in a variety of ways. As detailed above, in some examples the systems described herein may operate within a sandboxed environment that isolates an application's data and/or code execution from at least one other application (and sometimes all other applications). In these examples, identification module 104 may (as part of, e.g., a security application executing within security app sandbox 212 within user space 210 of computing device 202) identify an attempt by an application (e.g., an application executing within app1 sandbox 214(1)) to launch an application service by communicating with kernel space 220 (i.e., the space reserved for executing an operating system's kernel, kernel extensions, device drivers, etc.). For example, identification module 104 may obtain (by, e.g., communicating with kernel space 220) information that identifies at least one application or process (e.g., an application executing within app1 sandbox 214(1)) running on computing device 202. Identification module 104 may then identify (again, e.g., by communicating with kernel space 220 using, e.g., the application's UID or process name) any attempt by the application to launch an application service.

In some examples, identification module 104 may identify an attempt by an application to launch an application service in real time; i.e., identification module 104 may utilize a kernel-level hook to identify requests to launch services before the requests are granted. In other examples, however, identification module 104 may identify such attempts after the requests have been granted.

In some embodiments, modules 102 may (as part of, e.g., a security application executing within security app sandbox 212) require elevated privileges from a user of the computing device in order to request and obtain information that identifies applications that are running on the computing device and/or services launched by such applications. In these embodiments, modules 102 may prompt the user to grant such elevated privileges (e.g., during installation of the security application). In addition, identification module 104 may use a variety of different classes, methods, and commands when interacting with kernel space 220 to obtain information that identifies running applications and their associated services. For example, when executing within the ANDROID operating system, identification module 104 may utilize the ActivityManager class and its associated subclasses (e.g., ActivityManager.RunningAppProcessInfo, ActivityManager.RunningServiceInfo, etc.) and methods (e.g., getRunningAppProcesses, getRunningServices, etc.) to obtain such information from kernel space 220.

At step 304, the systems described herein may determine that the application (and/or its associated attempt to launch an application service) identified in step 302 represents a potential security risk. For example, determination module 106 may (as, e.g., part of the security application running within security app sandbox 212) determine that the application running within app1 sandbox 214(1) (and/or an attempt by this application to launch an application service) represents a potential security risk.

The phrase "potential security risk," as used herein, generally refers to any computing operation that is capable of harming, misappropriating, disrupting, misdirecting, and/or otherwise negatively impacting a user's computer hardware, software, or information. Examples of potential security risks include malware (e.g., viruses, worms, Trojan horses, ransomware), spyware, adware, scareware, etc. In some examples, an application (and/or its associated services) may be classified as a potential security risk if the application's reputation is unknown (i.e., if it is unknown whether the application is legitimate or malicious).

The systems described herein may perform step 304 in a variety of ways. For example, determination module 106 may determine that an application (and/or an attempt by this application to launch an application service) represents a security risk using signature-based techniques (by, e.g., matching the package or file names of the application or any of its associated services with a database of known-malicious applications and services), using behavioral heuristics (by, e.g., comparing the behavior of an application or any of its associated services with the behavior of known-malicious applications), and/or using any other technique capable of determining whether an application (or any of its associated services) is malicious.

At step 306, the systems described herein may prompt a user of the computing device to remediate the potential security risk posed by the application by performing a recommended security action. For example, notification module 108 may (as, e.g., part of a security application running within security app sandbox 212) prompt a user of computing device 202 to perform a recommended security action in order to remediate a potential security risk posed by an application running within app1 sandbox 214(1).

The phrase "security action," as used herein, generally refers to any act capable of protecting a computing device from, and/or repairing damage done by, a malicious application. Examples of security actions that notification module 108 may recommend to a user include, without limitation, terminating an application (e.g., closing or force-killing the application), uninstalling, deleting, or otherwise removing an application, downgrading or otherwise modifying the permissions associated with an application, installing a security application or process, running a security application or process, etc. In some examples, the security action recommended by notification module 108 in step 306 may represent a computing operation that security software is unable to perform by itself due to the sandboxed environment of computing device 202.

Figure 4:
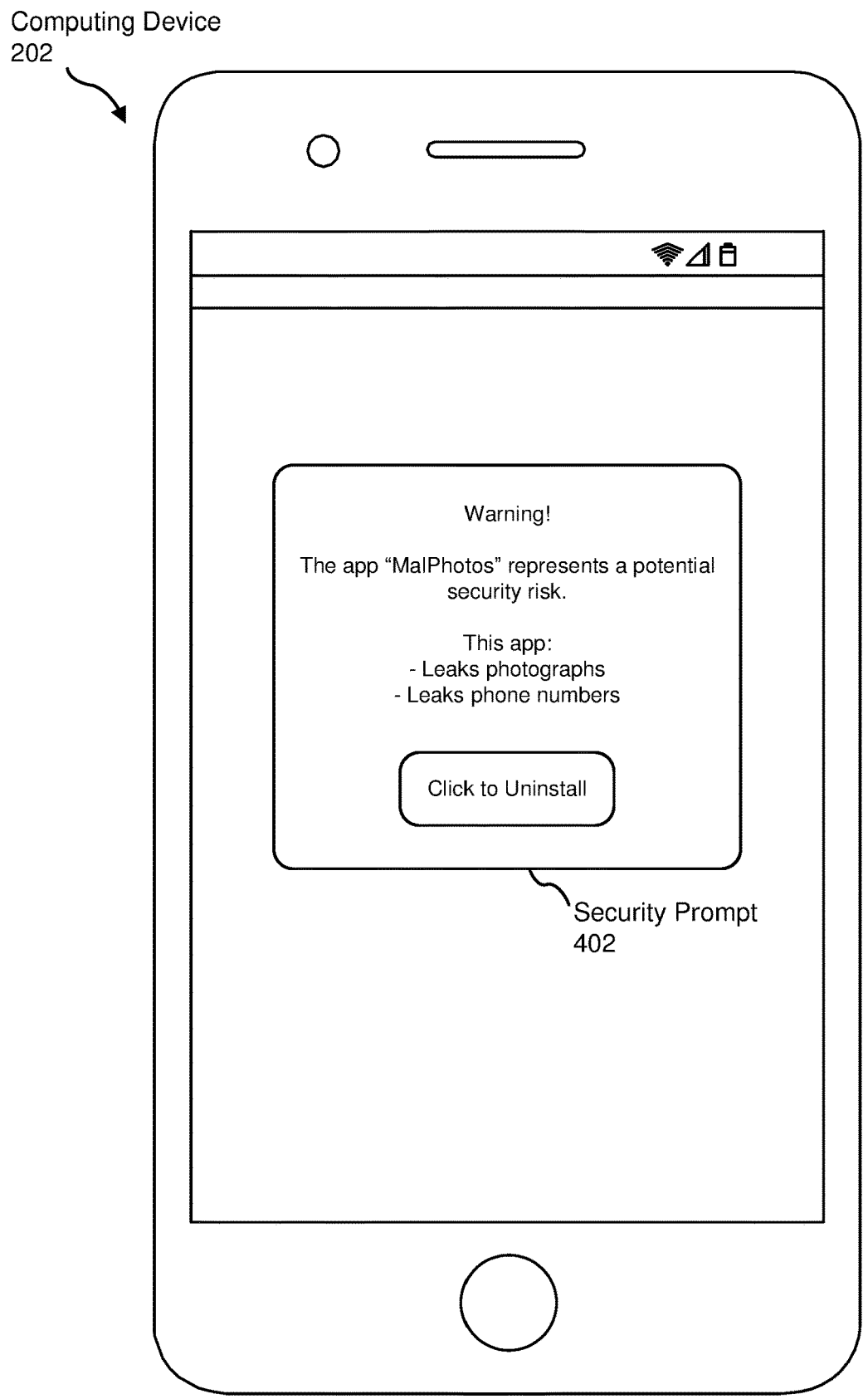
FIG. 4 is an illustration of an exemplary security prompt.

The systems described herein may include a variety of information within the security prompt generated in step 306. For example, notification module 108 may (1) identify the application in question, (2) indicate why the application in question represents a security risk, and/or (3) identify a recommended security action that the user should perform to remediate the security risk posed by the application. For example, as illustrated in FIG. 4, notification module 108 may generate a security prompt 402 that indicates that the application "MalPhotos" leaks photographs and phone numbers and should be uninstalled. In this example, a user of computing device 202 may uninstall the "MalPhotos" application by clicking the "Click to Uninstall" button provided in security prompt 402.

Returning to FIG. 3, at step 308 the systems described herein may, while waiting for the user to perform the recommended security action, secure the computing device by blocking the attempt by the application to launch an application service. For example, security module 110 may (e.g., as part of a security application running within security app sandbox 212 on computing device 202) block any attempt by a malicious application running within app1 sandbox 214(1) within user space 210 of computing device 202 to launch an application service.

The systems described herein may block attempts by applications to launch application services in a variety of ways. In examples where identification module 104 utilizes a kernel-level hook to identify requests to launch services before such requests are granted, security module 110 may prevent an application from launching an application service altogether. In examples where identification module 104 identifies such attempts after the requests have been granted, however, security module 110 may automatically terminate an application service immediately or shortly after an application launches the same. For example, when executing within the ANDROID operating system, security module 110 may utilize the ActivityManager class and its associated subclasses and methods (e.g., ActivityManager.killBackgroundProcesses) to immediately terminate all background processes or services associated with a given application or package.

If security module 110 cannot automatically terminate the application service in question (due, e.g., insufficient privileges and/or due to the nature of the sandboxed environment), then notification module 108 may prompt a user of computing device 202 to manually terminate (e.g., force-kill) the application that launched the application service. In such examples, notification module 108 may prompt the user on a periodic basis (e.g., every five seconds, every minute, every 30 minutes, etc.) until detecting that the user has successfully terminated the application.

In some embodiments, modules 102 may (as part of, e.g., a security application executing within security app sandbox 212) require elevated privileges from a user of the computing device in order to block and/or terminate application services. In these embodiments, modules 102 of the security application may prompt the user to grant such elevated privileges (e.g., during installation of the security application).

As detailed above, the sandboxed environment of computing device 202 may prevent each user application (including security software) running on computing device 202 from accessing any other application's sandbox, including the data and/or code stored therein. This lack of file-level access to other applications may, however, also limit the ability of security software installed within a sandboxed environment to perform common security actions, such as terminating, quarantining, and/or uninstalling malicious applications. As such, security software installed within the sandboxed environment of computing device 202 may need to rely on (and thus prompt) users to perform various security actions (e.g., terminating and/or uninstalling applications) in order to effectively secure computing device 202. Unfortunately, a user of computing device 202 may, even when prompted to do so, be unable (or delay or forget) to perform recommended security actions before a malicious application is able to harm, misappropriate, disrupt, and/or otherwise negatively impact the user's hardware, software, or information.

Figure 5:
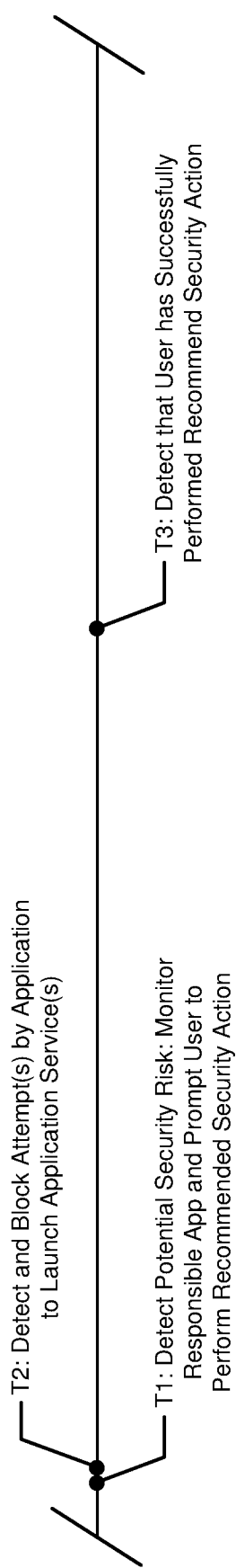
FIG. 5 is an illustration of an exemplary timeline for preventing malicious applications from exploiting applications services.

This problem (and the solution provided by the systems described herein) is highlighted in the timeline illustrated in FIG. 5. As shown in this figure, at time T1 a security application operating within a sandboxed environment (e.g., modules 102 of a security application running within security app sandbox 212 in FIG. 2) may detect a potential security risk, such as a malicious application installed or running on the computing device. Upon doing so, the security application may prompt a user of the computing device to perform a recommended security action that the security application may be unable to perform on its own due to the nature of the sandboxed environment (e.g., terminating and/or uninstalling the malicious application). In this example, but for the systems disclosed herein, the computing device in question may remain unprotected (and thus vulnerable to the identified security risk) during the window of time that spans from time T1 to time T3 when the user successfully performs the recommended security action.

To remedy this, immediately upon detecting the potential security risk at time T1, at time T2 the security application may monitor the application responsible for the identified security risk and block any attempts by this application to launch application services (by, e.g., preventing the application from launching application services and/or by automatically terminating any application services launched by the application). By doing so, the security application according to the systems disclosed herein may protect the computing device in question from the identified security risk until the user of the computing device is able to permanently remediate the same (by, e.g., performing the security action recommended by the security application).

Figure 6:
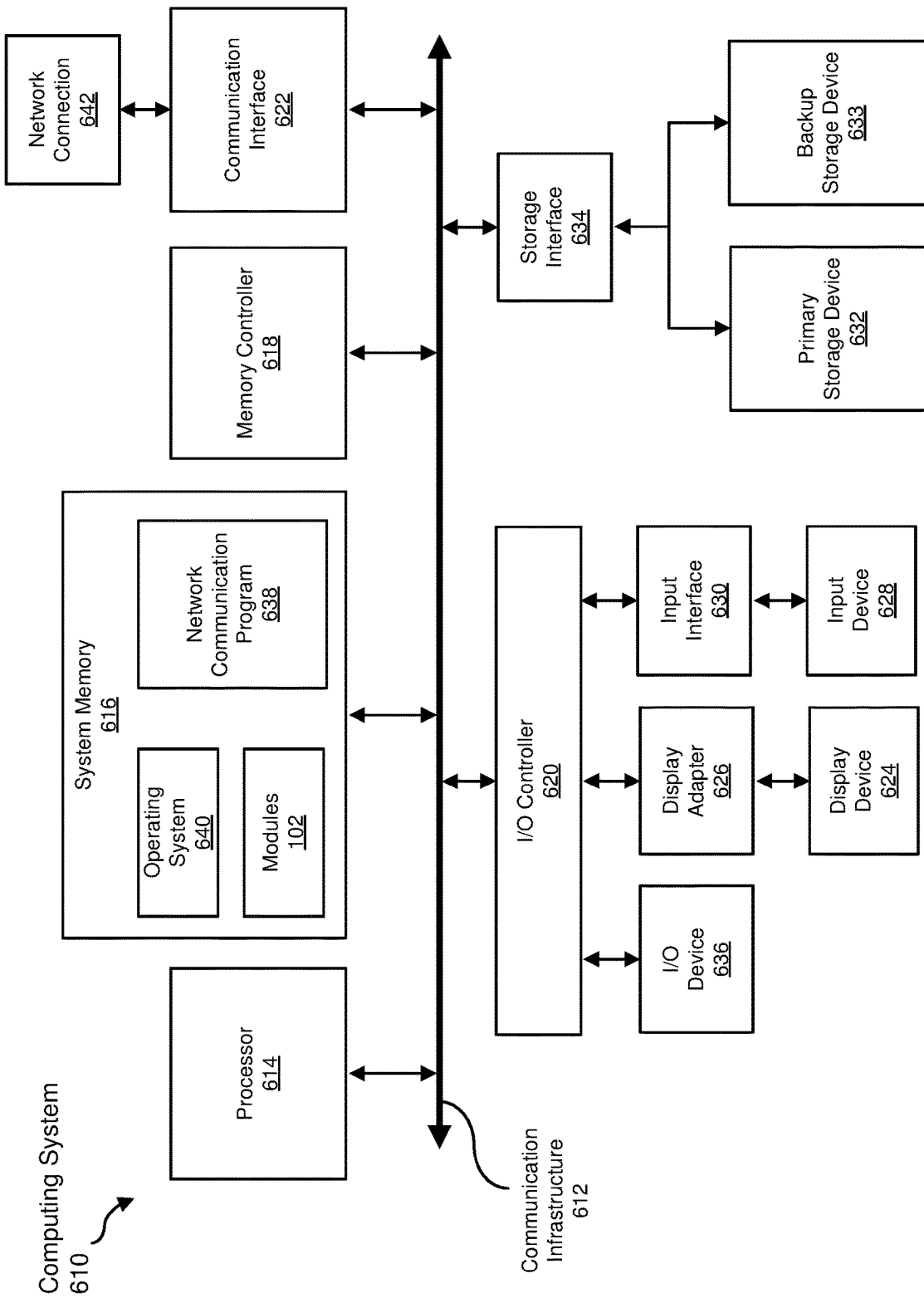
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
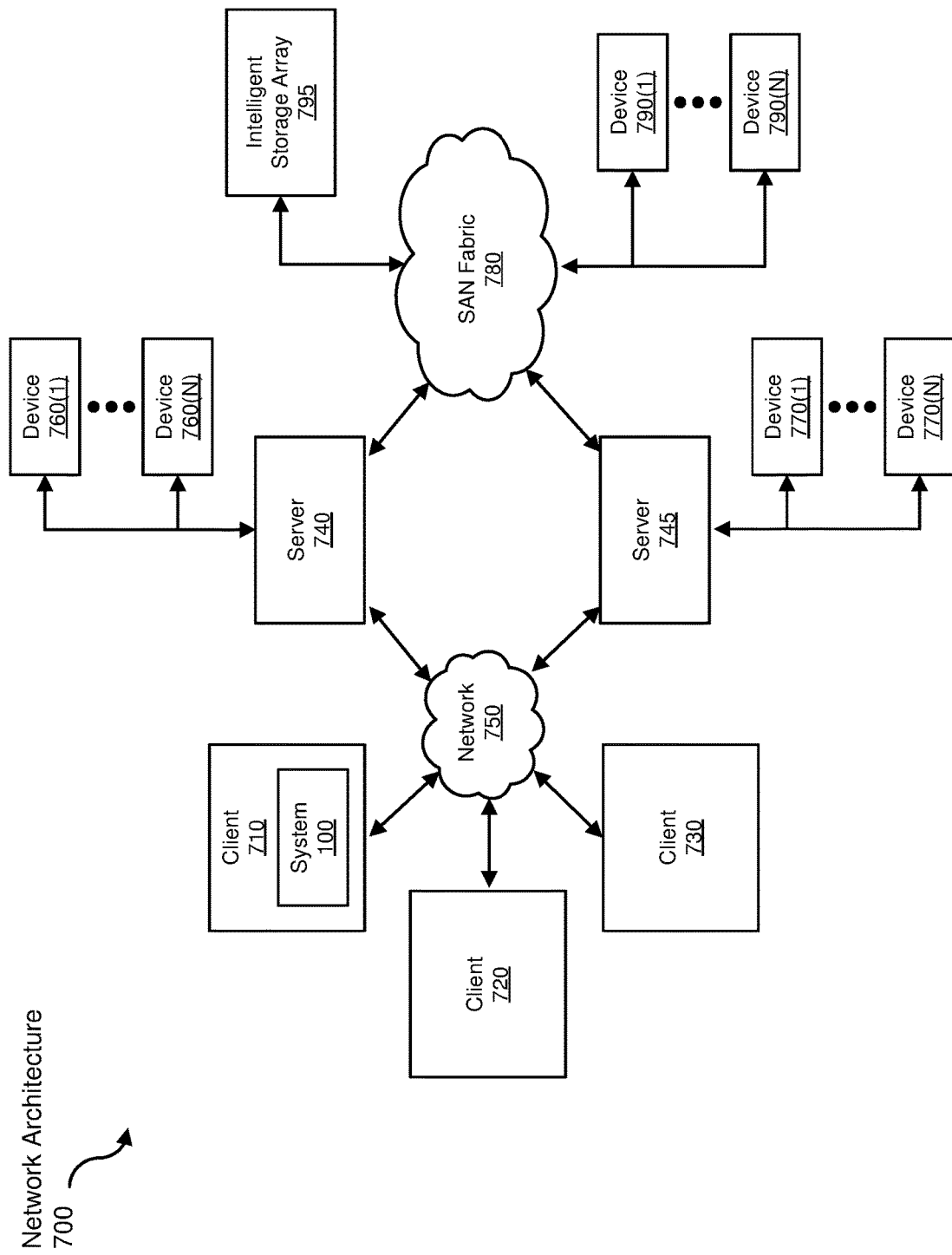
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for preventing malicious applications from exploiting application services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive information that identifies a potential security risk, transform that information into a recommended security action that will remediate the security risk, and then output the result of this transformation as a user prompt that recommends that a user perform the security action. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing malicious applications from exploiting application services, at least a portion of the method being performed by a computing device comprising at least one processor, the method comprising:
    identifying an attempt by an application, executing within a sandboxed environment that isolates the application's data and code execution from at least one other application executing within an operating system on the computing device, to launch at least one application service that comprises a computing task, the application comprising a malware application and the computing task executing in a computing environment background to share private user data with an unauthorized recipient;
    determining that the application represents a potential security risk using at least one of a signature-based technique that matches a file name of the application to a database of known-malicious applications or behavioral heuristics that compare behavior of the application with behavior of known-malicious applications;
    prompting a user of the computing device to remediate the potential security risk posed by the application by performing a recommended security action that the sandboxed environment prevents a security application from performing autonomously; and
    while waiting for the user to perform the recommended security action, the security application securing the computing device by utilizing the ActivityManager.killBackgroundProcesses method to automatically terminate the application service after the application has launched the application service;
    wherein:
    the identifying is performed by utilizing a kernel-level hook to identify a request to launch the application service prior to the request being granted; and
    the recommended security action comprises uninstalling or disabling the application such that the user is protected by preventing the application from sharing the private user data while waiting for the user to uninstall or disable the application.

2. The computer-implemented method of claim 1, further comprising prompting the user to grant, to the security application executing within the sandboxed environment, elevated privileges.

3. The computer-implemented method of claim 2, wherein the prompting is performed during installation of the security application.

4. The computer-implemented method of claim 2, wherein the elevated privileges enable the security application to request and obtain information that identifies applications that are running on the computing device and/or services launched by such applications.

5. The computer-implemented method of claim 1, wherein the operating system comprises ANDROID.

6. The computer-implemented method of claim 1, wherein identifying the attempt is performed through utilizing the ActivityManager class to interface with a kernel space of the operating system.

7. The computer-implemented method of claim 1, wherein the sandboxed environment prevents the security application from automatically quarantining the application.

8. The computer-implemented method of claim 1, further comprising, if the application service cannot be automatically terminated, prompting the user to manually terminate the application that launched the application service.

9. The computer-implemented method of claim 8, wherein prompting the user to manually terminate the application that launched the application service comprises periodically prompting the user to terminate the application until detecting that the user has successfully terminated the application.

10. A system for preventing malicious applications from exploiting application services, the system comprising:
    an identification module, stored in a memory device, that identifies an attempt by an application, executing within a sandboxed environment that isolates the application's data and code execution from at least one other application executing within an operating system on the system, to launch at least one application service that comprises a computing task, the application comprising a malware application and the computing task executing in a computing environment background to share private user data with an unauthorized recipient;
    a determination module, stored in the memory device, that determines that the application represents a potential security risk using at least one of a signature-based technique that matches a file name of the application to a database of known-malicious applications or behavioral heuristics that compare behavior of the application with behavior of known-malicious applications;
    a notification module, stored in the memory device, that prompts a user of the system to remediate the potential security risk posed by the application by performing a recommended security action that the sandboxed environment prevents a security application from performing autonomously;
    a security module, stored in the memory device, that, while waiting for the user to perform the recommended security action, secures the system by utilizing the ActivityManager.killBackgroundProcesses method to automatically terminate the application service after the application has launched the application service; and
    at least one physical processor that executes the identification module, the determination module, the notification module, and the security module;
    wherein:

the identification module identifies the attempt by utilizing a kernel-level hook to identify a request to launch the application service prior to the request being granted; and the recommended security action comprises uninstalling or disabling the application such that the user is protected by preventing the application from sharing the private user data while waiting for the user to uninstall or disable the application.

11. The system of claim 10, wherein the operating system sandboxes all applications executing within the operating system by isolating each application's data and code execution from all other applications executing within the operating system.

12. The system of claim 10, wherein the sandboxed environment prevents the security application from at least one of:

automatically quarantining the application; and
automatically uninstalling the application.

13. The system of claim 10, wherein the attempt to launch the application service comprises an attempt to at least one of:

capture sensitive information;
transmit sensitive information; and
access a malicious resource.

14. The system of claim 10, wherein the attempt to launch the application service comprises an attempt to at least one of:

modify user data;
generate a user prompt requesting elevated privileges; and
generate an advertisement.

15. The system of claim 10, wherein the notification module prompts the user to remediate the potential security risk posed by the application by prompting the user to at least one of:

terminate the application; and
uninstall the application.

16. The system of claim 10, wherein the sandboxed environment prevents the security application from automatically quarantining the application.

17. The system of claim 10, wherein the notification module prompts the user to manually terminate the application that launched the application service if the security module cannot automatically terminate the application service.

18. The system of claim 17, wherein the notification module prompts the user to manually terminate the application that launched the application service by periodically prompting the user to terminate the application until detecting that the user has successfully terminated the application.

19. A non-transitory computer-readable medium comprising one or more computer-executable instructions that, when executed by at least one processor of a computing device, cause the computing device to:

identify an attempt by an application, executing within a sandboxed environment that isolates the application's data and code execution from at least one other application executing within an operating system on the computing device, to launch at least one application service that comprises a computing task, the application comprising a malware application and the computing task executing in a computing environment background to share private user data with an unauthorized recipient;

determine that the application represents a potential security risk using at least one of a signature-based technique that matches a file name of the application to a database of known-malicious applications or behavioral heuristics that compare behavior of the application with behavior of known-malicious applications;

prompt a user of the computing device to remediate the potential security risk posed by the application by performing a recommended security action that the sandboxed environment prevents a security application from performing autonomously; and while waiting for the user to perform the recommended security action, secure the computing device by utilizing the ActivityManager.killBackgroundProcesses method to automatically terminate the application service after the application has launched the application service;

wherein:

the identifying is performed by utilising a kernel-level hook to identify a request to launch the application service prior to the request being granted; and the recommended security action comprises uninstalling or disabling the application such that the user is protected by preventing the application from sharing the private user data while waiting for the user to uninstall or disable the application.

20. The non-transitory computer-readable medium of claim 19, wherein the sandboxed environment prevents the security application from at least one of:

automatically quarantining the application; and
automatically uninstalling the application.

* * * * *